(12) United States Patent
Kunze

(10) Patent No.: US 10,237,456 B2
(45) Date of Patent: Mar. 19, 2019

(54) VEHICLE CAMERA ASSEMBLY PROCESS

(71) Applicant: MAGNA ELECTRONICS INC., Auburn Hills, MI (US)

(72) Inventor: Norbert Kunze, Diez (DE)

(73) Assignee: MAGNA ELECTRONICS INC., MI (US)

( * ) Notice: Subject to any disclaimer, the term of this patent is extended or adjusted under 35 U.S.C. 154(b) by 0 days.

(21) Appl. No.: 15/681,697

(22) Filed: Aug. 21, 2017

(65) Prior Publication Data

US 2018/0054555 A1     Feb. 22, 2018

Related U.S. Application Data

(60) Provisional application No. 62/377,878, filed on Aug. 22, 2016.

(51) Int. Cl.
| | |
|---|---|
| *H04N 5/225* | (2006.01) |
| *C09J 5/00* | (2006.01) |
| *B60R 1/00* | (2006.01) |
| *B60R 1/12* | (2006.01) |
| *B60R 11/04* | (2006.01) |
| *G08G 1/16* | (2006.01) |
| *B60R 11/00* | (2006.01) |

(52) U.S. Cl.
CPC ............ *H04N 5/2253* (2013.01); *B60R 1/00* (2013.01); *B60R 1/12* (2013.01); *B60R 11/04* (2013.01); *C09J 5/00* (2013.01); *H04N 5/2254* (2013.01); *B60R 2001/1253* (2013.01); *B60R 2011/004* (2013.01); *B60R 2300/105* (2013.01); *B60R 2300/303* (2013.01); *B60R 2300/607* (2013.01); *B60R 2300/804* (2013.01); *B60R 2300/8033* (2013.01); *B60R 2300/8093* (2013.01); *C09J 2205/31* (2013.01); *G08G 1/16* (2013.01)

(58) Field of Classification Search
CPC .... H04N 5/2253; H04N 5/2254; B60R 11/04; B60R 1/12; B60R 1/00; B60R 2011/004; B60R 2300/303; B60R 2001/1253; B60R 2300/8033; B60R 2300/804; B60R 2300/607; C09J 5/00; C09J 2205/31; G08G 1/16
See application file for complete search history.

(56) References Cited

U.S. PATENT DOCUMENTS

| | | |
|---|---|---|
| 5,204,615 A | 4/1993 | Richards |
| 5,525,264 A | 6/1996 | Cronin et al. |

(Continued)

*Primary Examiner* — Padma Haliyur
(74) *Attorney, Agent, or Firm* — Honigman LLP

(57) ABSTRACT

A camera assembly process for assembling a camera for a vehicle vision system includes aligning and affixing an imager PCB at a lens holder so as to align an imager with a lens. A connector PCB is electrically connected to the imager PCB. The lens holder, the connector PCB and the imager PCB are inserted into a housing portion, and a cage retains the connector PCB at the housing portion. A connector assembly is disposed at a rear portion of the housing, and electrically conductive terminals of the connector assembly electrically conductively connect to electrically conductive terminals of the connector PCB at a rear opening at the rear portion of the housing. The lens holder and the connector assembly are movable along a longitudinal axis of the camera assembly relative to the housing portion and adhesively retained thereat.

16 Claims, 3 Drawing Sheets

(56) References Cited

U.S. PATENT DOCUMENTS

| | | |
|---|---|---|
| 5,550,677 A | 8/1996 | Schofield et al. |
| 5,559,556 A | 9/1996 | Kagebeck |
| 5,657,539 A | 8/1997 | Orikasa et al. |
| 5,670,935 A | 9/1997 | Schofield et al. |
| 5,821,532 A | 10/1998 | Beaman et al. |
| 5,854,708 A | 12/1998 | Komatsu et al. |
| 5,872,332 A | 2/1999 | Verma |
| 5,920,061 A | 7/1999 | Feng |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,117,193 A | 9/2000 | Glenn |
| 6,151,065 A | 11/2000 | Steed |
| 6,178,034 B1 | 1/2001 | Allemand et al. |
| 6,193,378 B1 | 2/2001 | Tonar et al. |
| 6,222,447 B1 | 4/2001 | Schofield et al. |
| 6,259,475 B1 | 7/2001 | Ramachandran et al. |
| 6,292,311 B1 | 9/2001 | Bohn et al. |
| 6,481,003 B1 | 11/2002 | Maeda |
| 6,483,101 B1 | 11/2002 | Webster |
| 6,535,242 B1 | 3/2003 | Strumolo et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,651,187 B2 | 11/2003 | Lacey, III |
| 6,654,187 B2 | 11/2003 | Ning |
| 6,805,767 B2 | 10/2004 | Shinomiya |
| 6,897,432 B2 | 5/2005 | Schmidtke et al. |
| 7,015,944 B2 | 3/2006 | Holz et al. |
| 7,031,075 B2 | 4/2006 | Tsuji |
| 7,095,123 B2 | 8/2006 | Prior |
| 7,095,572 B2 | 8/2006 | Lee et al. |
| 7,215,479 B1 | 5/2007 | Bakin |
| 7,268,957 B2 | 9/2007 | Frenzel et al. |
| 7,289,037 B2 | 10/2007 | Uken et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,480,149 B2 | 1/2009 | DeWard et al. |
| 7,536,316 B2 | 5/2009 | Ozer et al. |
| 7,599,134 B2 | 10/2009 | Bechtel et al. |
| 7,665,915 B2 | 2/2010 | Lee |
| 7,697,056 B2 | 4/2010 | Huang |
| 7,768,574 B2 | 8/2010 | Humpston |
| 7,965,336 B2 | 6/2011 | Bingle et al. |
| 8,120,652 B2 | 2/2012 | Bechtel et al. |
| 8,256,821 B2 | 9/2012 | Lawlor et al. |
| 8,318,512 B2 | 11/2012 | Shah et al. |
| 8,482,664 B2 * | 7/2013 | Byrne ............... B60R 1/00 348/373 |
| 8,542,451 B2 | 9/2013 | Lu et al. |
| 8,994,878 B2 | 3/2015 | Byrne et al. |
| 9,233,641 B2 | 1/2016 | Sesti et al. |
| 9,277,104 B2 | 3/2016 | Sesti et al. |
| 9,338,334 B2 | 5/2016 | Lu et al. |
| 9,365,160 B2 | 6/2016 | Byrne et al. |
| 9,487,159 B2 | 11/2016 | Achenbach |
| 9,596,387 B2 | 3/2017 | Achenbach et al. |
| 9,992,392 B2 | 6/2018 | Byrne et al. |
| 2002/0167605 A1 | 11/2002 | Akimoto et al. |
| 2002/0175832 A1 | 11/2002 | Mizusawa |
| 2003/0090569 A1 | 5/2003 | Poechmueller |
| 2003/0137595 A1 | 7/2003 | Takachi |
| 2005/0104995 A1 | 5/2005 | Spryshak et al. |
| 2005/0141106 A1 | 6/2005 | Lee et al. |
| 2005/0190283 A1 | 9/2005 | Ish-Shalom et al. |
| 2005/0274883 A1 | 12/2005 | Nagano |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2007/0040034 A1 | 2/2007 | Hennick |
| 2007/0096020 A1 | 5/2007 | Mitsugi et al. |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2008/0122965 A1 | 5/2008 | Fang |
| 2009/0010494 A1 | 1/2009 | Bechtel et al. |
| 2009/0012203 A1 | 1/2009 | Nakanishi et al. |
| 2009/0244361 A1 | 10/2009 | Gebauer et al. |
| 2009/0295181 A1 | 12/2009 | Lawlor et al. |
| 2010/0015713 A1 | 1/2010 | Deeter et al. |
| 2010/0097519 A1 | 4/2010 | Byrne et al. |
| 2010/0103308 A1 | 4/2010 | Butterfield et al. |
| 2010/0279439 A1 | 11/2010 | Shah et al. |
| 2011/0025850 A1 | 2/2011 | Maekawa et al. |
| 2011/0298968 A1 | 12/2011 | Tseng et al. |
| 2012/0081550 A1 | 4/2012 | Sewell |
| 2012/0265416 A1 | 10/2012 | Lu |
| 2013/0242099 A1 | 9/2013 | Sauer et al. |
| 2014/0000804 A1 | 1/2014 | Looi et al. |
| 2014/0022657 A1 | 1/2014 | Lu et al. |
| 2014/0313337 A1 | 10/2014 | Devota et al. |
| 2014/0373345 A1 | 12/2014 | Steigerwald |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0255257 A1 | 9/2016 | Lu et al. |
| 2016/0268716 A1 | 9/2016 | Conger et al. |
| 2017/0054881 A1 | 2/2017 | Conger et al. |
| 2017/0129419 A1 | 5/2017 | Conger et al. |
| 2017/0133811 A1 | 5/2017 | Conger et al. |
| 2017/0201661 A1 | 7/2017 | Conger |
| 2017/0295306 A1 | 10/2017 | Mleczko |
| 2017/0302829 A1 | 10/2017 | Mleczko et al. |
| 2018/0013935 A1 | 1/2018 | Kunze et al. |
| 2018/0072239 A1 | 3/2018 | Wienecke et al. |
| 2018/0098033 A1 | 4/2018 | Mleczko et al. |

* cited by examiner

VEHICLE CAMERA ASSEMBLY PROCESS

CROSS REFERENCE TO RELATED APPLICATION

The present application claims the filing benefits of U.S. provisional application Ser. No. 62/377,878, filed Aug. 22, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera assembly process or method for assembling a vehicle camera for a driver assistance system or vision system or imaging system for a vehicle that utilizes one or more cameras (preferably one or more CMOS cameras) to capture image data representative of images exterior of the vehicle. The method or process assembles the camera components such that the components (such as the PCB or PCBs and electrical connector can float or move along a z-axis of the camera assembly relative to the camera housing. The PCB or PCBs may be supported by a cage that is disposed in the housing and that limits the insertion of the lens holder and PCBs into the housing. After the components are assembled together, the components can be adjusted relative to the housing and then an adhesive is applied and cured to retain the components relative to the housing. Thus, the camera assembly can be configured for the particular vehicle application of the camera and vision system application.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
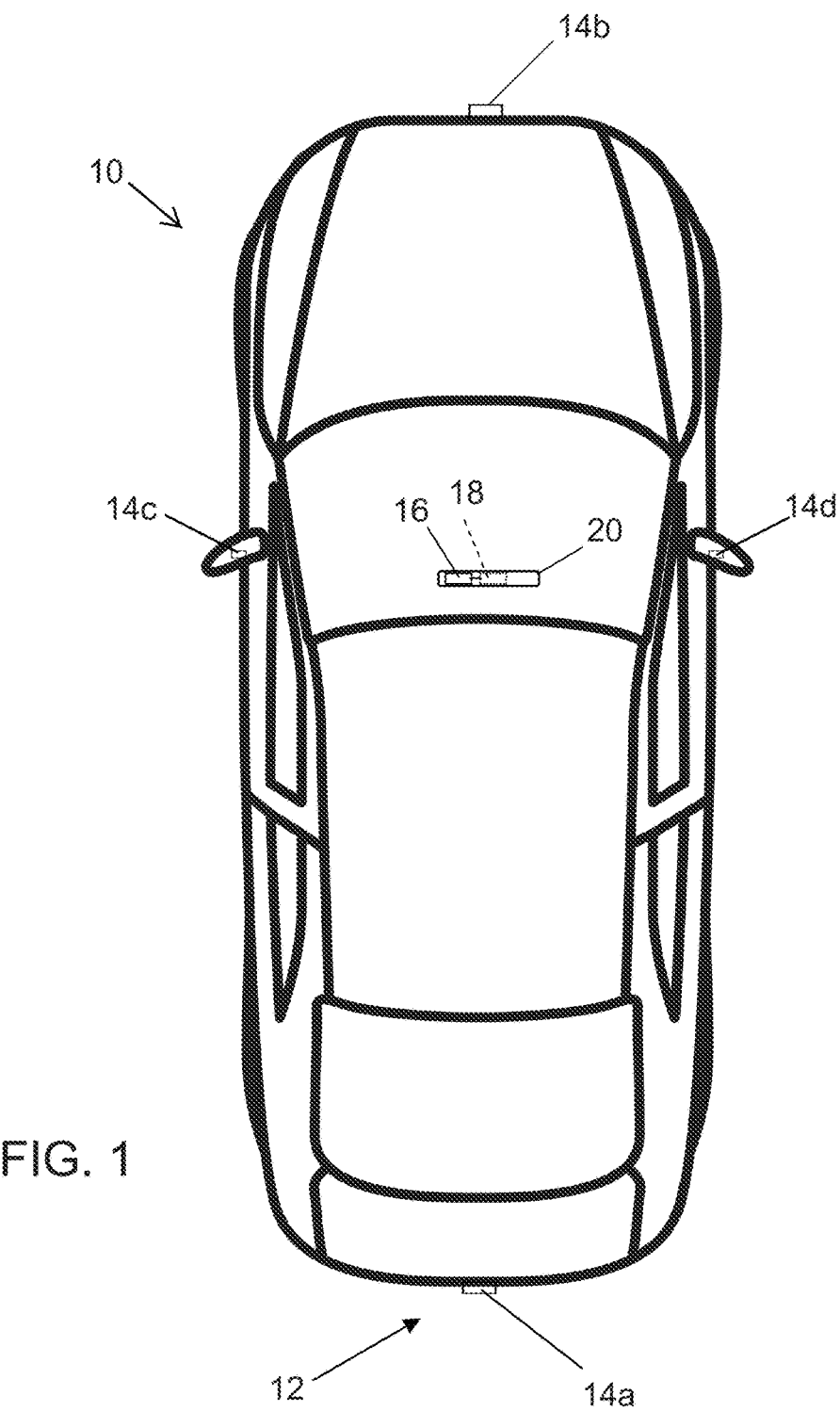
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
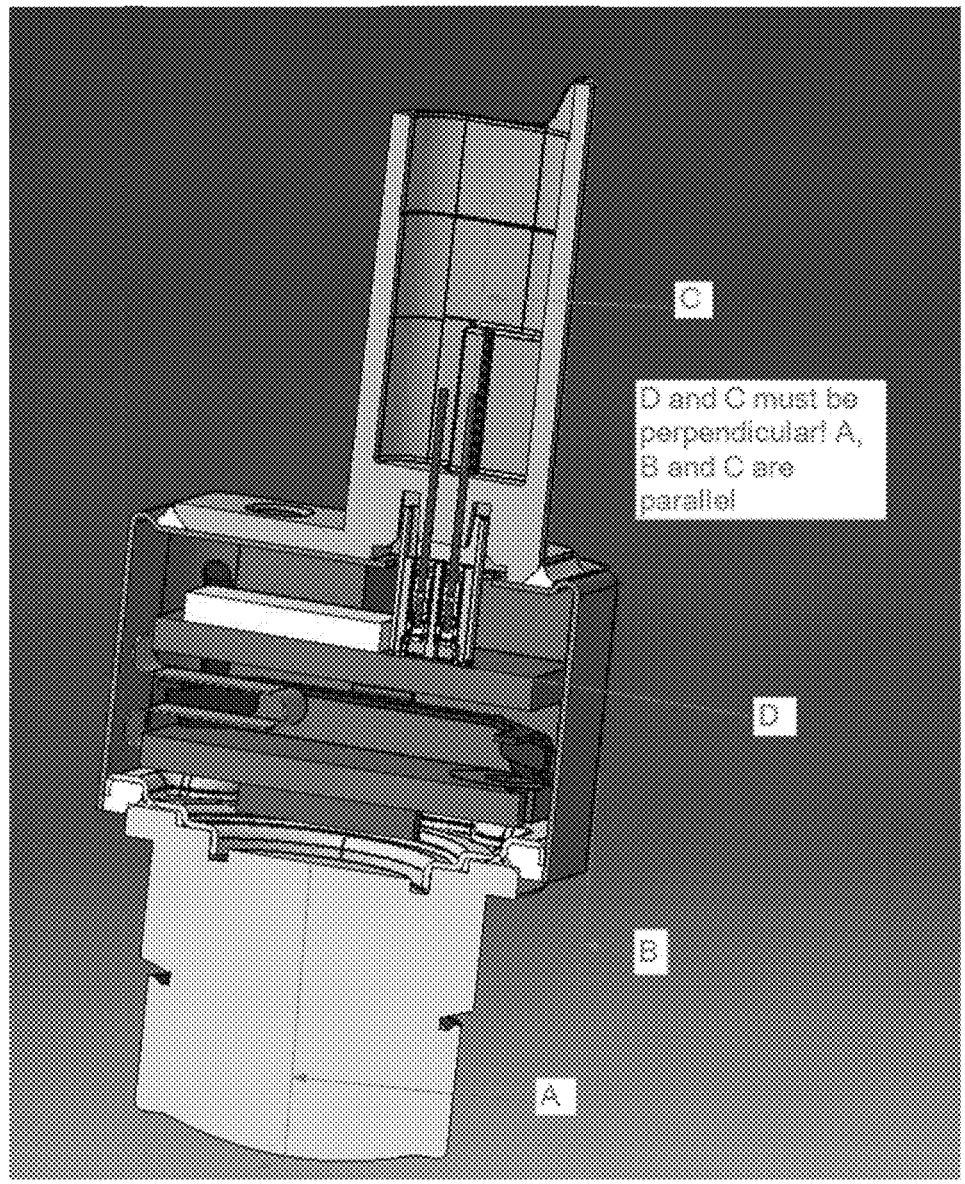
FIG. 2 is a sectional view of a camera assembly that is assembled in accordance with the present invention.
Figure 3:
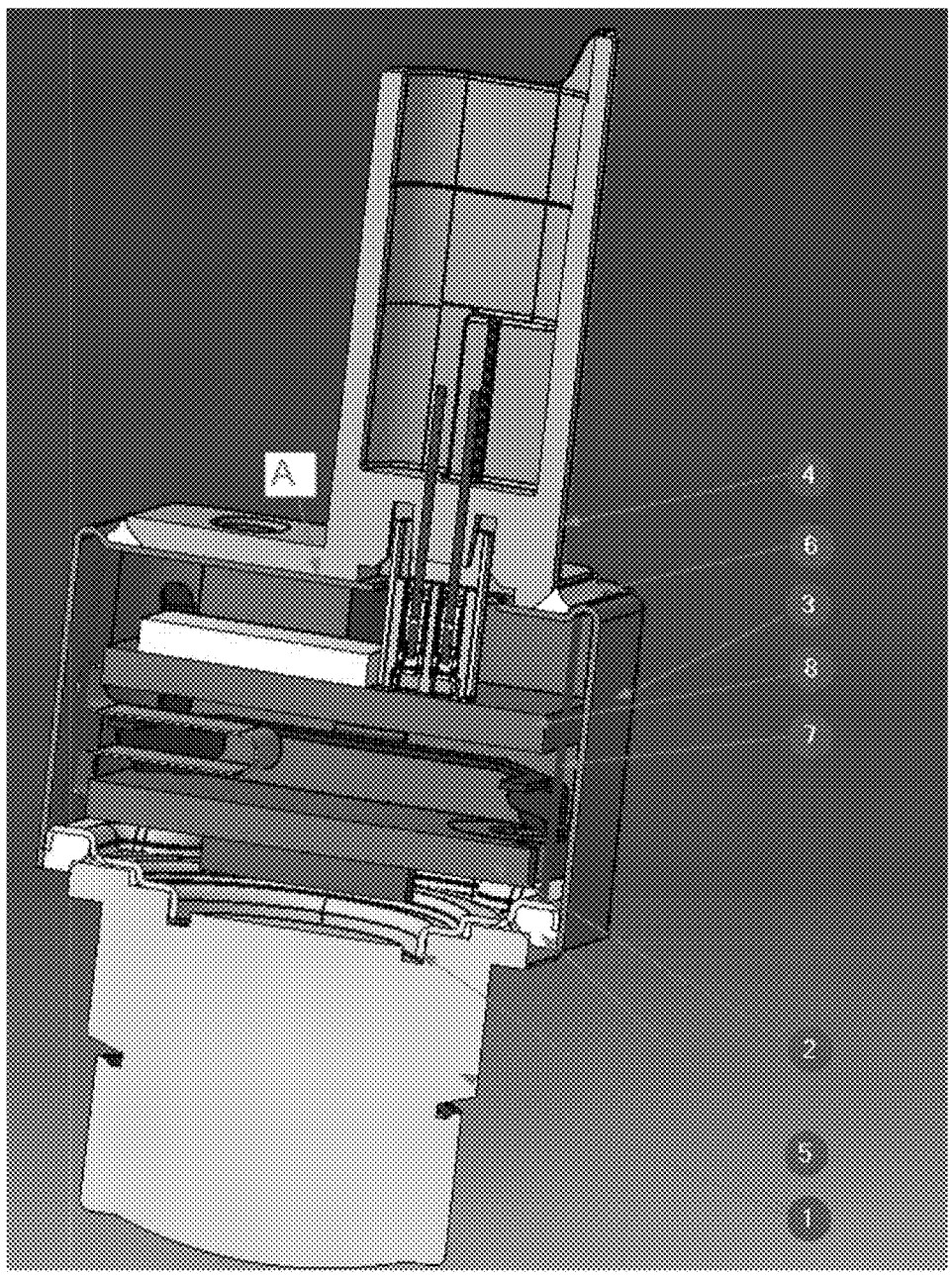
FIG. 3 is another sectional view of the camera assembly, showing the assembly steps.

As shown in FIGS. 2 and 3, the camera includes a lens holder that includes a lens or lens assembly, with an imager printed circuit board (PCB) and imager construction attached at the lens holder with the imager aligned with the lens. A second PCB is electrically connected to circuitry of the imager PCB and includes electrically conductive terminals or pins of an electrical connector (for electrically connecting the camera to a wire harness of the vehicle).

The present invention provides a universal camera design, with the lens already aligned and glued to the lens holder at the beginning of assembly. To obtain a "true" universal design where lines A and B are parallel, a flexible connection between the imager PCB and the connector PCB is needed. In that case the customer connector is at a well-defined position also. This provides enhanced fit for the various vehicle applications. The camera provides for a flexible connection, and the sub-assembly process for PCB-Package will vary depending on that.

With reference to FIG. 3, the assembly process of the present invention provides a PCB-package (including the imager PCB 2, cage 7, and connector PCB 8), with the cage floating in an optical direction "z" while the imager PCB is floating in an x-y plane relative to the connector PCB. The lens and lens holder assembly 1 is placed in a jig, and adhesive or glue is disposed for the imager PCB 2 on the lens holder. The PCB package is placed and aligned, and the rear cover or housing portion 3 is placed and affixed so as to receive the lens holder therein (with the lens holder placed as deep as possible and locally press fit in the rear cover) to keep the position and to obtain electrical contact, and to position the cage using supports at the lens holder and therefore position the connector PCB in the z-direction. The cage stops or limits the insertion or plunge of the lens holder. The cage may bias or urge the PCBs apart and to separate them, and the cage may comprise a spring element or the like that engages the PCBs and the housing and the lens holder to position the components along and relative to the housing, while still allowing for z-axis adjustment relative to the housing. A tilt angle between both PCBs may still exist.

Thus, the connector PCB and imager PCB may be engaged with the cage and the cage may be inserted into the housing (along the longitudinal axis of the housing) until the cage stops or limits insertion with the lens holder at the front opening of the housing and the electrically conductive connectors of the connector PCB at the rear opening of the housing. The rear connector portion is then disposed at the rear of the housing to electrically connect the electrically conductive connectors of the connector PCB to the terminals of the connector portion. The rear connector portion is then adhesively or otherwise bonded at the rear of the housing and the lens holder is adhesively or otherwise bonded at the front of the housing to complete the camera assembly process.

A paste is applied (if necessary only) through a hole in the rear cover at what is covered later by a customer connector. The customer connector assembly 4 is provided with molded-in pins and is disposed or inserted into the header until it lays on the surface of the rear cover or housing portion (with its position defined by or determined by reference holes at the rear cover but not held in z-direction). This position is maintained until the camera assembly is finished, with some adhesive provided between the rear cover 3 and the connector 4 at their mating surfaces A. Optionally, the subassembly comprising the rear cover and the connector may be assembled at the supplier.

An adhesive (such as a UV curable adhesive) is then applied (in its uncured state) at locations 5 and 6 (FIG. 3). A hardening process (such as a UV curing process or the like) of the adhesive 5 and 6 is then performed in one step.

Thus, the assembly process of the present invention allows for assembly of the camera components, with the components being adjustable along the z-axis after initial assembly, such that application of and curing of adhesive applied at opposite end regions of the housing portion affixes the components relative to the housing at the desired or appropriate location relative to the housing. The optical axis of the lens assembly, the z-axis of the housing and the direction of the electrical connection at the rear electrical connector are parallel to one another to allow for z-axis adjustment during assembly (and prior to application of and curing of the adhesive), with the plane of the PCB or PCBs being normal to the z-axis.

The camera and cage may utilize aspects of the cameras described in U.S. patent application Ser. No. 15/642,749, filed Jul. 6, 2017, and published on Jan. 11, 2018 as U.S. Patent Publication No. US-2018-0013935, which is hereby incorporated herein by reference in its entirety. The lens and imager alignment of the camera may utilize aspects of the camera assemblies described in U.S. Pat. Nos. 8,542,451 and/or 9,277,104, which are hereby incorporated herein by reference in their entireties. The camera may include electrical connecting elements that may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0054881; US-2017-0133811 and/or US-2017-0201661, and/or U.S. patent applications, Ser. No. 15/478,274, filed Apr. 4, 2017, and published Oct. 12, 2017 as U.S. Patent Publication No. US-2017-0295306 and/or Ser. No. 15/487,459, filed Apr. 14, 2017, and published Oct. 19, 2017 as U.S. Patent Publication No. US-2017-0302829, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331;

6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly process for assembling a camera for a vision system of a vehicle, said camera assembly process comprising:

providing a lens holder including a lens;

providing an imager PCB having a printed circuit board and an imager disposed at said printed circuit board;

aligning and affixing said imager PCB at said lens holder so as to align said imager with said lens;

providing a connector PCB having a printed circuit board and electrically conductive terminals;

electrically connecting said connector PCB to said imager PCB;

providing a housing portion having a rear opening at a rear portion of said housing;

inserting said lens holder and said connector PCB and said imager PCB into said housing portion, wherein a cage retains said connector PCB at said housing portion;

providing a connector assembly and disposing said connector assembly at said rear portion of said housing, wherein electrically conductive terminals of said connector assembly electrically conductively connect to said electrically conductive terminals of said connector PCB at said rear opening at said rear portion of said housing when said lens holder and said connector PCB and said imager PCB are inserted into said housing portion and when said connector assembly is disposed at said rear portion of said housing;

wherein said cage comprises structure to retain said connector PCB relative to said imager PCB;

wherein said connector PCB and said imager PCB engage said cage and are retained thereat before inserting said lens holder and said connector PCB and said imager PCB into said housing portion;

wherein said cage limits insertion of said lens holder into said housing;

wherein, with said lens holder inserted relative to said housing portion and said connector assembly disposed at said rear portion of said housing portion, said lens holder and said connector assembly are movable along a longitudinal axis of said camera assembly relative to said housing portion;

after said lens holder is inserted relative to said housing portion and after said connector assembly is disposed at said rear portion of said housing, applying adhesive at an interface of said connector assembly and said rear portion of said housing portion and applying adhesive at an interface of said lens holder and said housing portion; and after applying adhesive, curing the adhesive at the interfaces to retain said connector assembly at said rear portion of said housing portion and to retain said lens holder at said housing portion.

2. The camera assembly process of claim 1, wherein curing the adhesive at the interfaces is done via a single curing process.

3. The camera assembly process of claim 1, wherein curing the adhesive at the interfaces is done via a UV curing process.

4. The camera assembly process of claim 1, wherein said cage is configured to support said connector PCB relative to said lens holder.

5. The camera assembly process of claim 1, wherein, with said lens holder and said connector assembly movable along the longitudinal axis of said camera assembly relative to said housing portion, said lens holder and connector assembly are not movable relative to said housing portion in a direction normal to the longitudinal axis.

6. The camera assembly process of claim 1, wherein the longitudinal axis is parallel to an optical axis of said lens.

7. The camera assembly process of claim 1, wherein electrically connecting said connector PCB to said imager PCB comprises electrically connecting circuitry of said connector PCB to circuitry of said imager PCB via a flexible connector.

8. The camera assembly process of claim 1, wherein said cage comprises a spring element that engages said connector PCB, said imager PCB, said housing and said lens holder to position said connector PCB, said imager PCB and said lens holder relative to said housing, while allowing for adjustment of said connector PCB, said imager PCB, and said lens holder relative to said housing and along the longitudinal axis of said housing.

9. The camera assembly process of claim 1, wherein said connector PCB and said imager PCB engage said cage and are retained thereat as said connector PCB and said imager PCB are inserted into said housing portion.

10. The camera assembly process of claim 1, wherein said electrically conductive terminals of said connector assembly are received at and electrically conductively connect to said electrically conductive terminals of said connector PCB when said lens holder and said connector PCB and said imager PCB are inserted into said housing portion and when said connector assembly is disposed at said rear portion of said housing.

11. The camera assembly process of claim 1, wherein, after said lens holder and said connector PCB and said imager PCB are inserted into said housing portion, said connector assembly is disposed at said rear portion of said housing to said electrically conductively connect electrically conductive terminals of said connector assembly to said electrically conductive terminals of said connector PCB.

12. A camera assembly process for assembling a camera for a vision system of a vehicle, said camera assembly process comprising:

providing a lens holder including a lens;

providing an imager PCB having a printed circuit board and an imager disposed at said printed circuit board;

aligning and affixing said imager PCB at said lens holder so as to align said imager with said lens;

providing a connector PCB having a printed circuit board and electrically conductive terminals;

electrically connecting said connector PCB to said imager PCB;

providing a housing portion having a rear opening at a rear portion of said housing;

inserting said lens holder and said connector PCB and said imager PCB into said housing portion, wherein a cage retains said connector PCB at said housing portion;

providing a connector assembly and disposing said connector assembly at said rear portion of said housing, wherein electrically conductive terminals of said connector assembly electrically conductively connect to said electrically conductive terminals of said connector PCB at said rear opening at said rear portion of said housing when said lens holder and said connector PCB and said imager PCB are inserted into said housing portion and when said connector assembly is disposed at said rear portion of said housing;

wherein, with said lens holder inserted relative to said housing portion and said connector assembly disposed at said rear portion of said housing portion, said lens holder and said connector assembly are movable along a longitudinal axis of said camera assembly relative to said housing portion;

wherein said cage comprises structure to retain said connector PCB relative to said imager PCB;

wherein said cage engages said connector PCB, said imager PCB, said housing and said lens holder to position said connector PCB, said imager PCB and said lens holder relative to said housing, while allowing for adjustment of said connector PCB, said imager PCB and said lens holder relative to said housing and along the longitudinal axis of said housing;

wherein said cage limits insertion of said lens holder relative to said housing;

after said lens holder is positioned relative to said housing portion and after said connector assembly is disposed at said rear portion of said housing, applying adhesive at an interface of said connector assembly and said rear portion of said housing portion and applying adhesive at an interface of said lens holder and said housing portion; and after applying adhesive, curing the adhesive at the interfaces to retain said connector assembly at said rear portion of said housing portion and to retain said lens holder at said housing portion.

13. The camera assembly process of claim 12, wherein, with said lens holder and said connector assembly movable along the longitudinal axis of said camera assembly relative to said housing portion, said lens holder and connector assembly are not movable relative to said housing portion in a direction normal to the longitudinal axis.

14. The camera assembly process of claim 12, wherein, after said lens holder and said connector PCB and said imager PCB are inserted into said housing portion, said connector assembly is disposed at said rear portion of said housing to said electrically conductively connect electrically conductive terminals of said connector assembly to said electrically conductive terminals of said connector PCB.

15. A camera assembly process for assembling a camera for a vision system of a vehicle, said camera assembly process comprising:

providing a lens holder including a lens;

providing an imager PCB having a printed circuit board and an imager disposed at said printed circuit board;

aligning and affixing said imager PCB at said lens holder so as to align said imager with said lens;

providing a connector PCB having a printed circuit board and electrically conductive terminals;

electrically connecting said connector PCB to said imager PCB;

providing a housing portion having a rear opening at a rear portion of said housing;

providing a cage;

engaging said connector PCB and said imager PCB with said cage;

inserting said cage, with said connector PCB and said imager PCB engaged therewith, into said housing portion, wherein said cage retains said connector PCB at said housing portion;

inserting said lens holder relative to said housing, wherein said cage limits insertion of said lens holder relative to said housing portion;

providing a connector assembly and disposing said connector assembly at said rear portion of said housing, wherein electrically conductive terminals of said connector assembly electrically conductively connect to said electrically conductive terminals of said connector PCB at said rear opening at said rear portion of said housing when said lens holder and said connector PCB and said imager PCB are inserted into said housing portion and when said connector assembly is disposed at said rear portion of said housing;

wherein, with said lens holder inserted relative to said housing portion and said connector assembly disposed at said rear portion of said housing portion, said lens holder and said connector assembly are movable along the longitudinal axis of said camera assembly relative to said housing portion;

wherein said cage comprises a spring element that engages said connector PCB, said imager PCB, said housing and said lens holder to position said connector PCB, said imager PCB and said lens holder relative to said housing, while allowing for adjustment of said connector PCB, said imager PCB, and said lens holder relative to said housing and along the longitudinal axis of said housing;

wherein, with said cage movable along the longitudinal axis of said camera assembly relative to said housing portion, said lens holder and said connector assembly are not movable relative to said housing portion in a direction normal to the longitudinal axis;

after said lens holder is inserted relative to said housing portion and after said connector assembly is disposed at said rear portion of said housing, applying adhesive at an interface of said connector assembly and said rear portion of said housing portion and applying adhesive at an interface of said lens holder and said housing portion; and after applying adhesive, curing the adhesive at the interfaces to retain said connector assembly at said rear portion of said housing portion and to retain said lens holder at said housing portion.

16. The camera assembly process of claim 15, wherein the longitudinal axis is parallel to an optical axis of said lens.

* * * * *